(12) United States Patent
Tormasov et al.

(10) Patent No.: US 11,354,196 B2
(45) Date of Patent: Jun. 7, 2022

(54) SYSTEM AND METHOD OF DETERMINING A BACKUP SCHEDULE BASED ON DATA ANALYSIS AND MACHINE LEARNING

(71) Applicant: Acronis International GmbH, Schaffhausen (CH)

(72) Inventors: Alexander Tormasov, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 16/876,499

(22) Filed: May 18, 2020

(65) Prior Publication Data

US 2020/0364113 A1 Nov. 19, 2020

Related U.S. Application Data

(60) Provisional application No. 62/848,776, filed on May 16, 2019.

(51) Int. Cl.
*G06F 11/14* (2006.01)

(52) U.S. Cl.
CPC ...... *G06F 11/1461* (2013.01); *G06F 11/1451* (2013.01); *G06F 11/1464* (2013.01); *G06F 11/1466* (2013.01); *G06F 11/1469* (2013.01)

(58) Field of Classification Search
CPC ............. G06F 11/1461; G06F 11/1464; G06F 11/1451; G06F 11/1466; G06F 11/1469
USPC ....................................................... 711/162
See application file for complete search history.

(56) References Cited

U.S. PATENT DOCUMENTS

2015/0365478 A1* 12/2015 Bernal .................... H04L 67/10
709/203
2020/0285542 A1* 9/2020 Deshpande ......... G06F 11/1461

* cited by examiner

*Primary Examiner* — Yair Leibovich
(74) *Attorney, Agent, or Firm* — ArentFox Schiff LLP; Michael Fainberg

(57) ABSTRACT

Disclosed herein are systems and method for determining a backup schedule on a computer system. In one exemplary aspect, a method may comprise collecting user behavior data on the computer system and analyzing the user behavior data to determine an optimal time of a backup session to create backup copies of modified data stored on a volume of the computer system. The method may comprise determining an optimal duration of the backup session based on the analyzed user behavior and prioritizing portions of the modified data based on priority rules. The method may comprise determining a prioritized portion of the modified data that can be saved during the backup session based on the duration, computer system hardware and network bandwidth at the optimal time of backup, and performing the backup session comprising the prioritized portion.

20 Claims, 5 Drawing Sheets

SYSTEM AND METHOD OF DETERMINING A BACKUP SCHEDULE BASED ON DATA ANALYSIS AND MACHINE LEARNING

CROSS-REFERENCE TO RELATED APPLICATIONS

This application claims the benefit of U.S. Provisional Application No. 62/848,776, filed May 16, 2019, which is herein incorporated by reference.

FIELD OF TECHNOLOGY

The present disclosure relates generally to the field of data restoration, and more specifically, to systems and method of determining a backup schedule based on data analysis and machine learning.

BACKGROUND

Backups are generally performed for mobile computing devices when they are within range of a fast network or near a backup storage device. However, the mobile device may only be in range of the network or near the storage device for a limited amount of time that may not be enough to perform a backup of all modified data on the mobile device. This is of particular concern for business users who travel frequently and modify data on their device throughout their travels.

In such cases, the data volume for backup can reach many gigabytes. While the user may be in range of a fast network or near a backup storage device, it is probable that the duration of this condition is short, not allowing enough time to copy all of the modified files to the backup (for example, when using APPLE® time capsules). If the modified data on the mobile device is lost due to a crash, outage or the like, the portion of the modified data that has not been backed up yet may be unrecoverable, leading to loss of time in recreating the documents, loss of efficiency, and loss of the critical data itself—disrupting the business.

Therefore, effective planning techniques are needed to prevent data loss.

SUMMARY

To realize such planning techniques, aspects of the disclosure describe methods and systems for determining a backup schedule on a computer system.

In one exemplary aspect, a method may comprise collecting user behavior data on the computer system and analyzing the user behavior data to determine an optimal time of a backup session to create backup copies of modified data stored on a volume of the computer system. The method may comprise determining an optimal duration of the backup session based on the analyzed user behavior and prioritizing portions of the modified data based on priority rules. The method may comprise determining a prioritized portion of the modified data that can be saved during the backup session based on the duration, computer system hardware and network bandwidth at the optimal time of backup, and performing the backup session comprising the prioritized portion.

In some aspects, the user behavior data comprises when the user frequently modifies data, when the user saves the data to the computer and usage of applications.

In some aspects, the method may comprise analyzing the user behavior data using neural networks in order to determine the optimal time of the backup session.

In some aspects, the priority rules assess at least one of: (1) whether a user manually selected a respective portion, (2) whether the respective portion is accessed more than a threshold amount of times, (3) whether the respective portion is labelled a critical file by the computer system, (4) whether the respective portion is accessed for a longer than a threshold duration, (5) whether the respective portion was previously backed up within a threshold period of time.

In some aspects, each priority rule is associated with a respective weight, and the method for prioritizing portions of the modified data further comprises identifying a plurality of portions in the modified data, determining a subset of the plurality of portions that satisfy any of the priority rules, and ranking the subset of the plurality of portions based on the respective weight of a respective priority rule. In some aspects, a respective portion with a higher rank is backed up prior to a respective portion with a lower rank.

In some aspects, the analyzing of the user behavior is performed for user activity occurring within a predetermined period of time on the computer system and the method may further comprise determining that the user is performing a particular activity based on an analysis of the user behavior and determining an optimal start, duration, and length of the backup session according to the particular activity.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of determining a backup schedule based on data analysis and machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
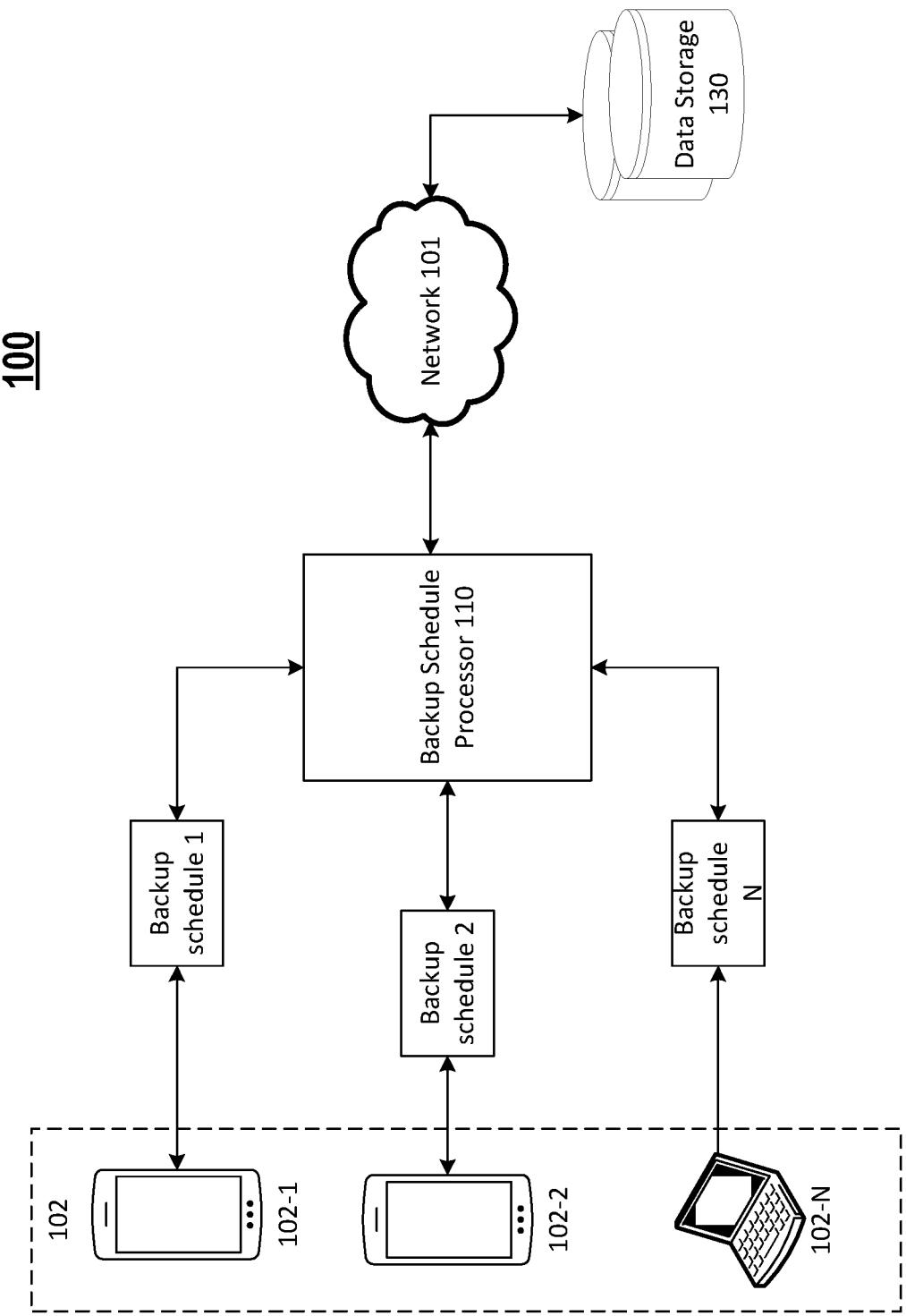
FIG. 1 is an illustration of a system of determining a backup schedule based on data analysis and machine learning, in accordance with exemplary aspects of the present disclosure.

FIG. 1 is a block diagram illustrating a system 100 of determining a backup schedule based on data analysis and machine learning, in accordance with exemplary aspects of the present disclosure.

The system 100 comprises a network 101, a plurality of computing devices 102-1, 102-2 to 102-N (collectively referred to as computing devices 102), a backup schedule processor 110 and data storage 130. The backup schedule processor 110 observes activity (user behavior, data creation, modification, deletion, etc.) at each computing device 102-1 to 102-N and generates a custom tailored backup schedule 1-N based on the activity, corresponding to each device to expand backup coverage for devices that may be mobile and change networks and/or locations often. The plurality of computing devices 102-1 to 102-N may include laptop computers, smartphone devices, tablet computing devices or the like. In order to backup important data that has been modified on the computing devices 102, the data must be regularly backed up. Throughout various stages of usage, the computing devices 102 may connect to a high speed network, they may lose connection to the high speed network, they may or may not have or be near an external storage device or the like. Thus, it becomes difficult to fully backup large amounts of modified data from these various devices 102.

Accordingly, the backup schedule processor 110 observes, collects and processes the user behavior in addition to the modified data on computing devices 102 and generates a tiered classification of importance based on user behavior associated with the particular data. In addition the backup schedule processor 110 observers the duration of time each of the computing devices 102 may be in a particular state, for example connected to their home or corporate network, near a device for storing backups or the like. In exemplary aspects, the device may be an external hard disk, network assisted storage (NAS), or the like, and may be detected on connection, though other methods are also contemplated herein.

The collected user behavior also includes when a user usually makes most of the changes in files and/or data, when these changes are saved to the system, whether the user has just returned from a trip (e.g., using geolocation of the device), the use of particular programs or the like. The collected user behavior may include any user behavior on each of the computing devices 102 that may be used to draw a statistical conclusion about when a user may perform a particular activity. As the backup and schedule processor 110 collects more historical data about the user behavior and modified data, the backup and schedule processor 110 is in an improved position to suggest more accurate parameters for backup(s) of each of the devices 102. In some aspects, the historical data of one device associated with a user may be used to determine backup parameters for another device with a similar fingerprint, and/or a device that has developed a similar pattern of usage over time, as determined by the backup schedule processor 110.

The backup schedule processor 110 then generates a customized backup schedule, e.g., backup schedule 1-N that correspondingly conforms with the needs of each of the computing devices 102-1 to 102-N. The system 100 slowly adapts to the behavior of the devices and the frequency of travel or the like over time and generates (e.g., updates) increasingly accurate backup schedules over time. As enough data is gathered on the behavior of the devices 102, the backup schedule processor 110 can predict, based on time and user behavior, where the device may be located, whether it may be an ideal time to perform a backup or not, and which data is prioritized for backup over other data. In exemplary aspects, the backup schedule processor 110 may form the backup schedule 1, for example, breaking up individual backups into more important and relatively less important data types (e.g., files), where more important files are backed up in priority. Additionally, the backup schedule processor 110 allows for feedback from each individual user of the devices 102 to improve or correct backup schedules. In some aspects, the backup schedule processor 110 may learn from events such as interrupted backups, failure to save particular data, or the like, to generate improvements in the schedule automatically, and/or how to recover from such events.

According to exemplary aspects, neural networks may be used to analyze the user data (user behavior/modified data) in order to render a more accurate prediction regarding the time, duration and amount of data that can be backed up, along with error correction as a large amount of data is accumulated. Files may be classified by the neural networks, for example using several parameters including the frequency of the use of a particular application and its corresponding documents. Those applications that are used most often may have a higher priority than other applications because it is highly likely that files and documents related to those applications are used frequently. Another parameter for classification of files may include the appropriateness of the file or data for backup. For example, the origination of the files, such as where the files were downloaded (e.g., via an audio/video services), files synced using a different cloud sync/share service, or the like, may be excluded from the backup entirely. Another parameter may include the file type assigned to the file at a file system level—e.g., ".log" files may be excluded or the like. Machine learning may be used over time to learn and classify the files automatically as well, based on user's frequency of access, size, metadata (e.g., name and/or tag information) or the like.

In exemplary aspects, the neural network may first be prepared by identifying a set of data that the neural network can use for learning. In some aspects, those events that are tracked in the memory of a neural network are defined, such as user actions, typical file operations and the like. After this set of data is properly defined, the neural network processes the data using various algorithms (e.g., convolution, softmax) across multiple layers, the algorithms selected to achieve a predetermined goal and based on the type of defined data. After neural network processing is complete, the neural network generates weights for processing input parameters that may be used for subsequent backup copying—a form of a backup plan that determines optimal strategy for protecting user data so maximum backup coverage of the data can be achieved, given a set of constraints (e.g., the prioritization of data, the time of day, location of the device, network speed of the network the device is connected to, or the like).

As each backup is generated, the computing devices 102 store the backup in data storage 130 over network 101 according to the determined backup schedule, though in some aspects, each computing device may be using a different network to access the network 101 and ultimately the data storage 130. In a specific example, the backup schedule 1 may indicate that Thursday, 8 PM EST through Monday 4 am EST is the best time window to perform a device backup for device 102-1. Furthermore, the backup schedule 1 may indicate that data files in the "My Documents" folder, and the "Clients" folder are most often updated, and thus are prioritized over other data in backups. In exemplary aspects, a user may indicate or define which directories are copied first, second and so on and can override any priority predictions made by the backup schedule processor 110. In some aspects, the start time, duration and priority information may be predicted by the backup schedule processor 110 and then submitted to the user for approval, correction or cancellation prior to any backup schedule being created, and the user may edit the parameters of the backup schedule as he or she may deem fit.

The backup schedule 1 may indicate the size and/or number of files that can be accommodated in the particular backup. The backup schedule processor 110 determines the number of files along with how much data (e.g., data length or size) can be backed up during the specified time. This determination will first depend of the hardware of the device 102 and available network bandwidth, and then be based upon the determined duration of the backup in the schedule. Accordingly, the computing device 102-1 will first store data from the "My Documents" and "Clients" folder prior to any other data into the data storage 130, and will work backward from there to backup lower priority data, or data less than a particular size. The result is a complete or near-complete set of backups for each computing device 102 for when recovery is required due to a crash, disaster or the like.

In some aspects, two neural networks may be used to realize the systems and methods of the present disclosure. The first neural network may predict a schedule indicating when the user will be connected to a network, for how long, and the anticipated upload speed. The second neural network may determine a priority level for a portion of modified data to be backed up (e.g., the priority level of a file in a plurality of files to be backed up). Both neural networks can be of any type such as feedforward, radial basis function, multilayer perceptron, convolutional, recurrent, etc.

The first neural network may be trained using a multi-dimensional data structure that comprises training inputs and training outputs. The first X amount of columns may represent a training input (e.g., a 1×5 input vector). Each column may represent a different parameter. Exemplary parameters may be captured in respective columns indicating the name of the network (e.g., Wi-Fi name), the type of network (e.g., wired/wireless), location (e.g., GPS coordinates), usage start time (e.g., 12:00 pm on Monday). One skilled in the art will appreciate that additional parameters can be included in the training inputs such as the device type being used, whether a backup was initiated, the size of the backup, whether the backup was successful, etc. The output training vector may comprise two parameters: anticipated duration of network access and average network upload speed. For example, the following input vector: {Office Wifi, wireless, 42.484334, −71.196292, 12:00 on Monday, smartphone} may be accompanied with {15, 23}. This indicates that while the user's smartphone was connected to the Wi-Fi network "Office Wifi," at 12:00 pm on Monday, the user had an average network upload speed of 23 Mbps for 15 minutes. There may be a plurality of input data vectors in the input dataset that capture a historic record of when and how the user had access to various networks. Accordingly, the first neural network is able to predict, given a time, location, network connection, etc., how long and at what speed can a backup be allotted.

Given an anticipated time window, the second neural network can prioritize files that need to be backed up to fill in the time window with a backup session. The second neural network may also be trained using a multi-dimensional data structure comprising training inputs and outputs. A training input may comprise X different parameters including, but not limited to, the name of a file, the frequency of access, the frequency of backups, the duration of access, the size of the file, and the frequency of modification. Based on these input parameters, as captured in a vector, there may an output "overall priority." The overall priority may be a numerical value that indicates how important a file is. The training dataset may include predetermined overall priority assignments (e.g., values between 1 and 10) that allow the second neural network to map various input parameters to an overall priority. Based on this training, the second neural network may generate the overall priority of any file when given the input parameters of the file.

The backup schedule processor 110 may identify a plurality of portions of modified data (where each portion may contain a single file). The backup schedule processor 110 may input each portion's input parameters required by the second neural network to receive an overall priority of the portion. Subsequently, the backup schedule processor 110 may rank each portion in order of highest to lowest overall priority. The backup schedule processor 110 may then input a time and the required input parameters of the first neural network to receive a duration and network upload speed. Based on the rankings, duration, and network upload speed, the backup schedule processor 110 may schedule a backup session.

Figure 2:
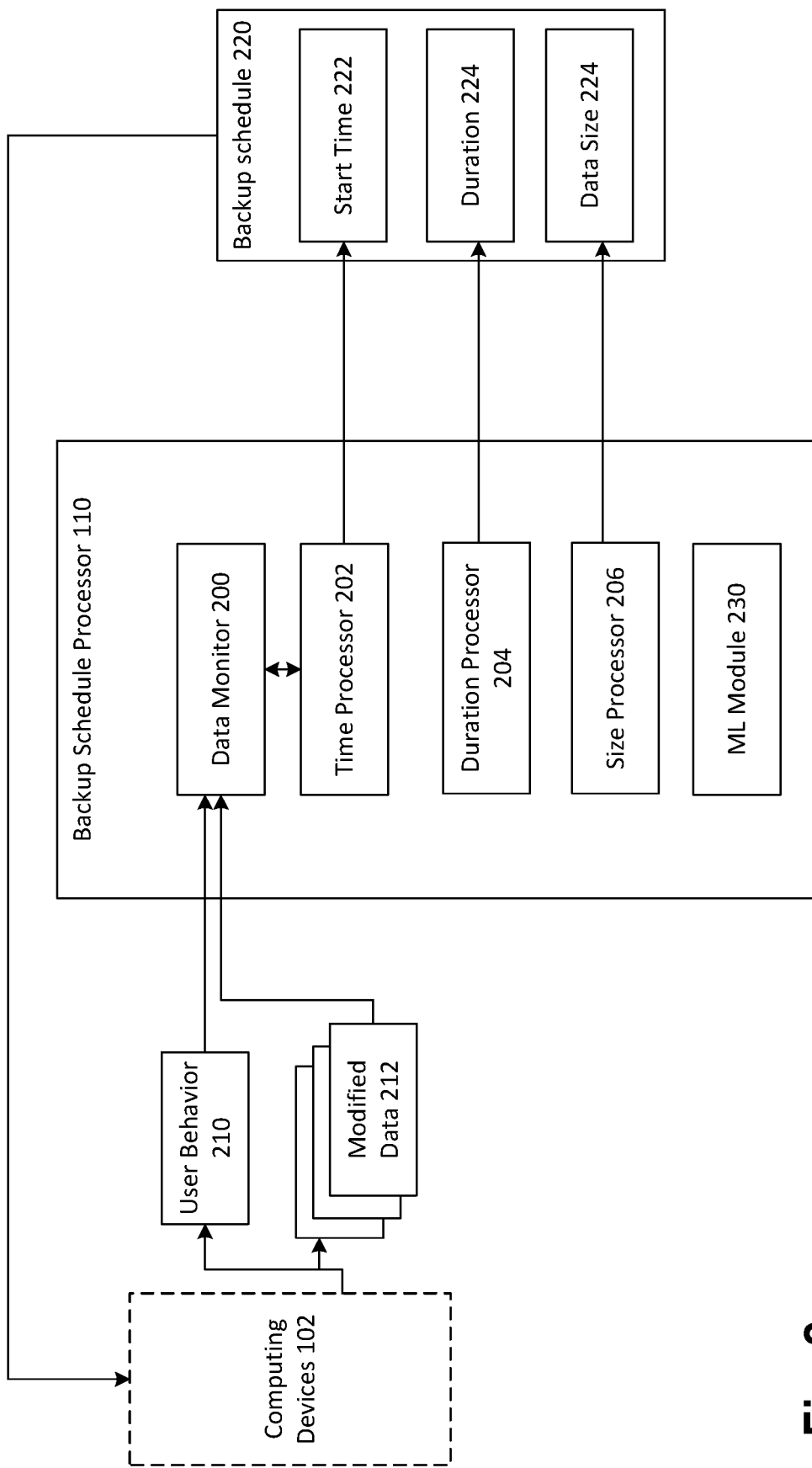
FIG. 2 is a block diagram of the backup schedule processor 110, according to exemplary aspects of the disclosure.

FIG. 2 is a block diagram of the backup schedule processor 110, according to exemplary aspects of the disclosure.

The backup schedule processor 110 may comprise a data monitor 200, a time processor 202, a duration processor 204 and a size processor 206. The data monitor may monitor user behavior 210 and modified data 212 on the computing devices 102. This information is then used by the backup schedule processor 110 to generate a backup schedule 220 for a particular computing device. The time processor 202 generates one or more start times 222 for the scheduled backup based on when user activity is frequently observed based on the user behavior 210. This activity may include the device being located and/or connected to a home or corporate local network, and/or detecting that the device is connected to and/or near a storage device such as an eternal hard disk, NAS or the like.

The duration processor 204 calculates a duration 224 of the backup window based on the user behavior 210. For example, if the user behavior 210 indicates that the user frequently connects to a home or corporate network for 30 minutes on Thursday at 10:00 PM and for three hours on Friday from 9:00 AM to 12:00 PM, the determination being based on regular observations over a predetermined period of time, the backup window may be respectively scheduled for 30 minutes and three hours in those specified time slots. Alternatively, the backup may be scheduled for a slightly smaller duration to ensure that backups are performed, configurable by an administrator of the backup schedule processor 110. The duration is crucial in determining how much data can be saved during a particular backup session. For example, if only thirty minutes are available for backup, those prioritized files that are able to be saved within that time frame based on hardware device speed and network bandwidth, will be backed up. Other prioritized and lower priority files will be distributed across other longer backup sessions, such as the three hour time slot on Friday. Additionally, the duration 224 may also indicate whether there is a data pool for a particular backup session. Knowing the duration of the backup window, the volume of data (the data pool) that can be backed up can be accurately determined and the data can be properly classified based on priority. This avoids a situation where only unimportant data was saved during the backup window, and important files were not backed up.

The size processor 206 calculates how data size 226 of many files or how much data can be saved in a particular backup session. The data size 226 and the duration 224 are interrelated in that the duration will dictate the number or size of files that can be backed up during the session, however a user may reduce the number of files manually in order to ensure a clean and successful backup of those files selected for backup.

The backup schedule processor 110 may also include a machine learning module 230 that helps the backup schedule processor 110 learn to classify and generate priorities of files over time, in addition to learning and modeling user behavior to generate backup start times, durations and size parameters. Machine learning can be used by many of the various components of system 100 when there is enough volume of date to collect and classify the data. The data can then be processed to alter various configurations or parameters of the system 100. Machine learning can be applied to monitoring of user activities (behavior), for any analysis of data (such as deducing data types, values, access frequency, AV-scanning status and the like), in addition to other tasks such as suggesting optimal backup plans for various devices given their historical backup activity, suggesting particular prioritization schemes such as directory selection for prioritized files, critical application recognition or the like.

Figure 3:
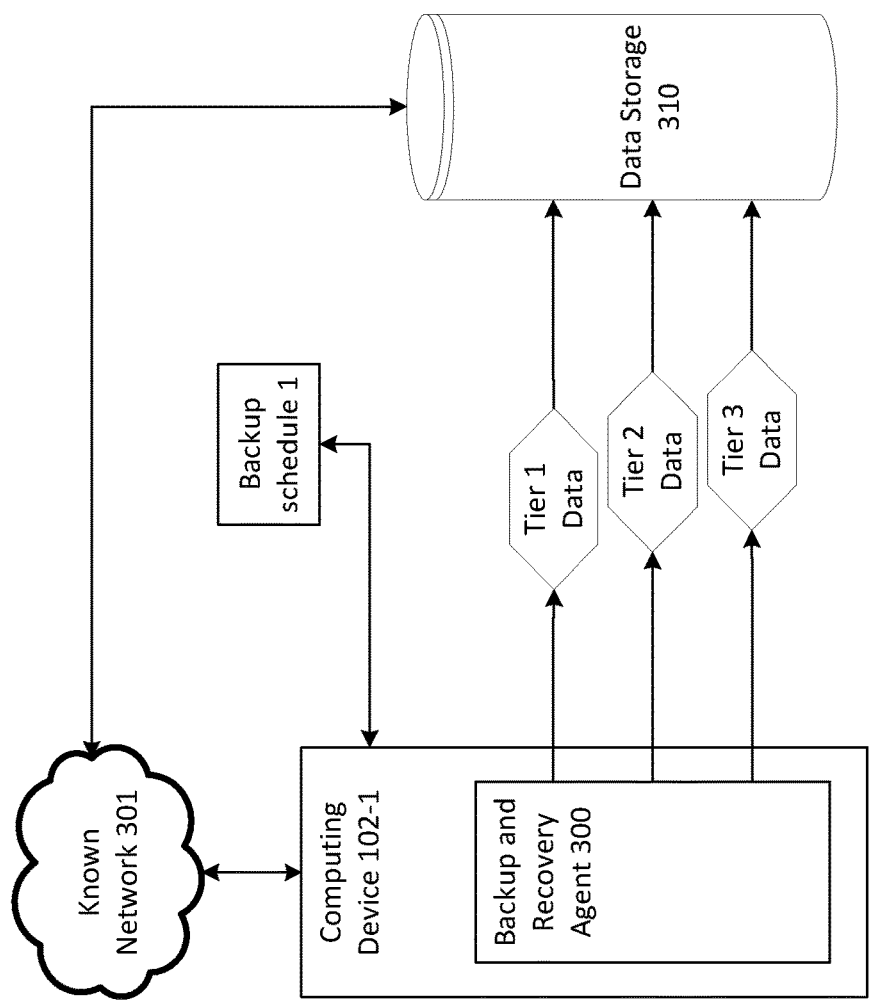
FIG. 3 is a block diagram illustrating a backup and recovery agent 300 on the computing device 102-1 according to exemplary aspects of the present disclosure.

FIG. 3 is a block diagram illustrating a backup and recovery agent 300 on the computing device 102-1 according to exemplary aspects of the present disclosure.

The backup schedule processor 110 generates the backup schedule 1 for the computing device 102-1. Now the backup and recovery agent 300 detects, for example, that the computing device 102-1 is connected to a known network 301. The known network 301 may be a high speed network that is a home or corporate network, or any trusted network. The backup and recovery agent 300 may also detect that the computing device 102-1 is close to data storage 310. In exemplary aspects, data storage 310 may be an external storage device, network attached storage or the like.

The backup and recovery agent 300 then consults the backup schedule 1 for when the backup is suggested to be started. At that time, in the first backup session, "Tier 1" data, or that data which is most highly prioritized is backed up to data storage 310. During the next backup session specified by the backup schedule 1, the backup and recovery agent 300 backs up the Tier 2 data to the data storage 310. The Tier 2 data is data that is not as highly prioritized as Tier 1 data, but is still nevertheless important and should be backed up. Finally, in this backup schedule, the last backup session begins where the backup and recovery agent 300 stores Tier 3 data, which is the least prioritized data according to the backup schedule 1. This may include data such as personal word documents, or the like. This data is finally stored in data storage 310. Accordingly, the files have been distributed across three different sessions based on their importance, so that they are all backed up at one point or another. In this manner, the computing device 102-1 may not have an immediate full backup, but over time there is significantly more data backup coverage than there was previously, where backups would proceed without regard to file importance, time of day, location of the computing device 102-1 or the like.

Figure 4:
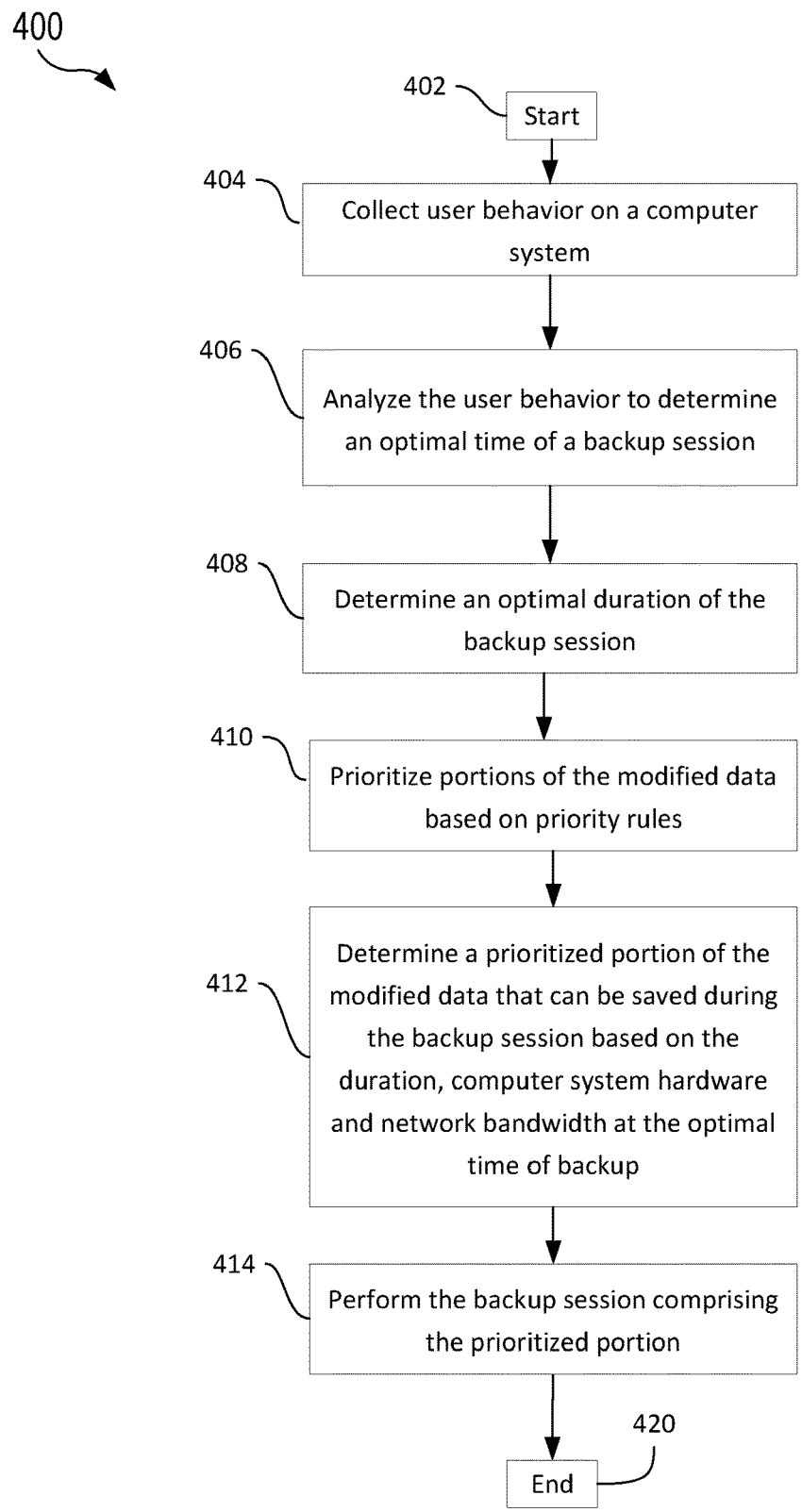
FIG. 4 is a flowchart illustrating a method of determining a backup schedule based on data analysis and machine learning, in accordance with exemplary aspects of the present disclosure.

FIG. 4 is a flowchart illustrating a method 400 of determining a backup schedule based on data analysis and machine learning, in accordance with exemplary aspects of the present disclosure.

The method begins at 402 and proceeds to 404.

At 404, the backup schedule processor 110 collects user behavior on a computer system (e.g., a computing device such as 102-1 to 102-N). The user behavior may include the applications that are launched, files that are used, frequency of use, timing of use, launch and/or modification, origination of files (e.g., download source, or the like), along with system level information such as boot up times, restart times, idle times, processor and memory capacity during user sessions, and other system/user event and action information that can be used to identify patterns of the user.

At 406, the backup schedule processor 110 analyzes the collected user behavior. The analysis includes identifying trends in when the computer is, for example, connected to or near a high speed network, specifically a home or office network, when a backup is actually able to be performed. Another option may be to identify when the user device is connected to a storage device such as a NAS device, external hard drive, and/or the like. The analysis may further include the types of modified files, the types of modifications, applications used and the like.

The backup schedule processor 110 then determines an optimal start time of one or more backup sessions to create backup copies of modified data stored on a volume associated with the computer system, e.g., a local disk or the like, based on the analysis of the user behavior. The start time may fall during a period that the user regularly is at home or in the office, or is otherwise connected to a network identified as, e.g., secure, and reliable, or specifically identified as a trusted network that is permitted to be used to perform a remote backup of the data on the computing device. In exemplary aspects, the backup software may schedule the start time when the machine is idle, yet connected to the network or the NAS, and/or external hard drive, to avoid slowing the computer down when the user is using the device. In some aspects, several backup sessions will be created, and each will have a corresponding start time.

At 408, the backup schedule processor 110 determines an optimal duration of the backup session based on user behavior of when the computer is actually located or capable of performing a backup. Accordingly, each backup session may have its own duration.

At 410, the backup schedule processor 110 prioritizes portions (e.g., individual files and applications) of the modified data based on priority rules. For example, those files determined to be associated with important applications are highly prioritized whereas less frequently used applications and their data are lower in priority.

The priority rules assess various factors. Each priority rule may be associated with a weight. The weight may be a numerical value that is used for ranking purposes. For example, the weight may be a value between 0 and 1. In terms of the priority rules, a priority rule may evaluate whether a user manually selected a respective portion (i.e., the user selected a file from the modified data that needs to be backed up). This may be associated with the highest weight (e.g., 1) because the user has specifically requested for the backup of the file.

Another priority rule may assess whether the respective portion is accessed more than a threshold amount of times within a certain timeframe (e.g., a file is accessed more than 5 times since installation). The weight for this rule may be proportional to the amount of times that the portion was accessed such that the more the portion is accessed, the greater its priority. Another priority rule may assess whether the respective portion is labelled a critical file by the computer system (e.g., certain operating systems label certain files as critical files that are needed for basic operation of the computer system). The weight for this rule may also be the maximum value. Another priority rule may assess whether the respective portion is accessed for longer than a threshold duration on average (e.g., whether the file is accessed for more than 5 minutes per day). The weight for this rule may be proportional to the average duration of access for the portion such that the longer the portion is accessed, the greater its priority. Another priority rule may assess whether the respective portion was previously backed up within a threshold period of time (e.g., whether the file was backed up within the last hour). In this case, a portion that has not been backed up previously is assigned a higher weight because the portion needs to be backed up to prevent data loss.

In some aspects, a portion may satisfy multiple priority rules. For example, a portion may consist of a file that is accessed several times in a time and for long durations. Suppose that the file is accessed 5 times on a daily basis and is assigned a first weight of 0.5 (for satisfying one priority rule) and the file is used for 20 minutes per usage session and is assigned a second weight of 0.6. These individual weights may be summed to determine the overall priority of the portion (e.g., 1.1). It should be noted that the overall priority (i.e., the sum of individual weights) may be greater than 1. If a given portion does not satisfy any of the priority rules, its overall priority is zero.

It should be noted that in some aspects the second neural network, described previously, may internally evaluate the priority rules (e.g., within its layers) to determine the overall priority of a respective portion.

At 412, the backup schedule processor 110 determines a prioritized portion of the modified data that can be saved during the backup session. The prioritized portion may be selected from a plurality of portions that make up the modified data, based on duration, bandwidth of a connected network, hardware capabilities of the device in question and the user behavior among other parameters. Each backup session may be associated with its own size.

For example, the plurality of portions may comprise five portions (e.g., five files). The backup schedule processor 110 may rank each portion based on the overall priority. Suppose that the overall priority for each portion is ranked as follows {1.1, 1, 0.9, 0.5, 0}. Each portion may be associated with a file size as follows {5000 MB, 4500 MB, 500 MB, 200 MB, 1000 MB}. Suppose that the backup schedule processor 110 is attempting to backup all five portions throughout the course of a 5 hour period. The network upload speed may be 20 MB/s when the network bandwidth is fully available and 5 MB/s when the network bandwidth is partially available. In the first hour, the user may not have access to the network. Accordingly, none of the portions are uploaded. In the second hour, the network may be partially available for 15 minutes before network access is ceased. Under the presumption that the network upload speed is a consistent 5 MB/s, 4500 MB can be uploaded during this time period. Accordingly, the backup schedule processor 110 may identify the highest ranked portion that can be fully uploaded within the time period. In this case, the first file has a size of 5000 MB. Because this size exceeds the amount of data that can be uploaded, the backup schedule processor 110 selects the second file for backup (prior to the first file) because the size condition is met. This allows for the second file, which is also an important file based on its overall priority, to be backed up fully.

Suppose that after the 15 minutes has transpired, the second file has been uploaded. The user may reconnect, for 10 minutes, to a network with free bandwidth and a 20 MB/s upload speed. During this time period, 12000 MB may be uploaded successfully. Accordingly, the backup schedule processor 110 backs up the remaining files in order of the rank (e.g., upload the first file, then the third, then the fourth, etc.).

The anticipated schedule of when the user will be connected to the network and the anticipated network upload speed may be determined with a neural network. The neural network may be trained using a dataset that indicates input parameters such as the user's history of connectivity to the network, the frequency of connecting to the network, the quality of the network, the typical amount of bandwidth consumed by the user, etc. Based on this dataset, the neural network may identify when the user connects to the network, for how long, and the anticipated upload speed. In response to determining this schedule for a particular time period (e.g., Monday between 3 pm and 5 pm), the backup schedule processor 110 may determine when to schedule the backup of a portion of modified data.

This example is kept simplistic for explanatory purposes. One skilled in the art will appreciate the backup schedule processor 110 may encounter several complex situations.

At 414, the backup schedule processor 110 distributes the modified data across a plurality of backup sessions based on the data classification, the optimal duration of the backup session and the size of data that can be saved during the optimal duration. The computing device 102-1 to 102-N then perform backups based on the sessions indicated in each backup schedule determined by the backup schedule processor 110. Therefore, each backup session will perform a backup of a particular set of files over a period of time, however the prioritized files will be backup up first to ensure they are recoverable in case of a crash, a disaster or the like. In exemplary aspects, the first backup session will include only the highest priority modified data, while each subsequent session will have lower priority data than the last. However, in some aspects, each backup session saves modified data of all priorities, but orders the highest priority data to be backed up prior to lower priority data within the same session.

At 420, the method terminates.

Figure 5:
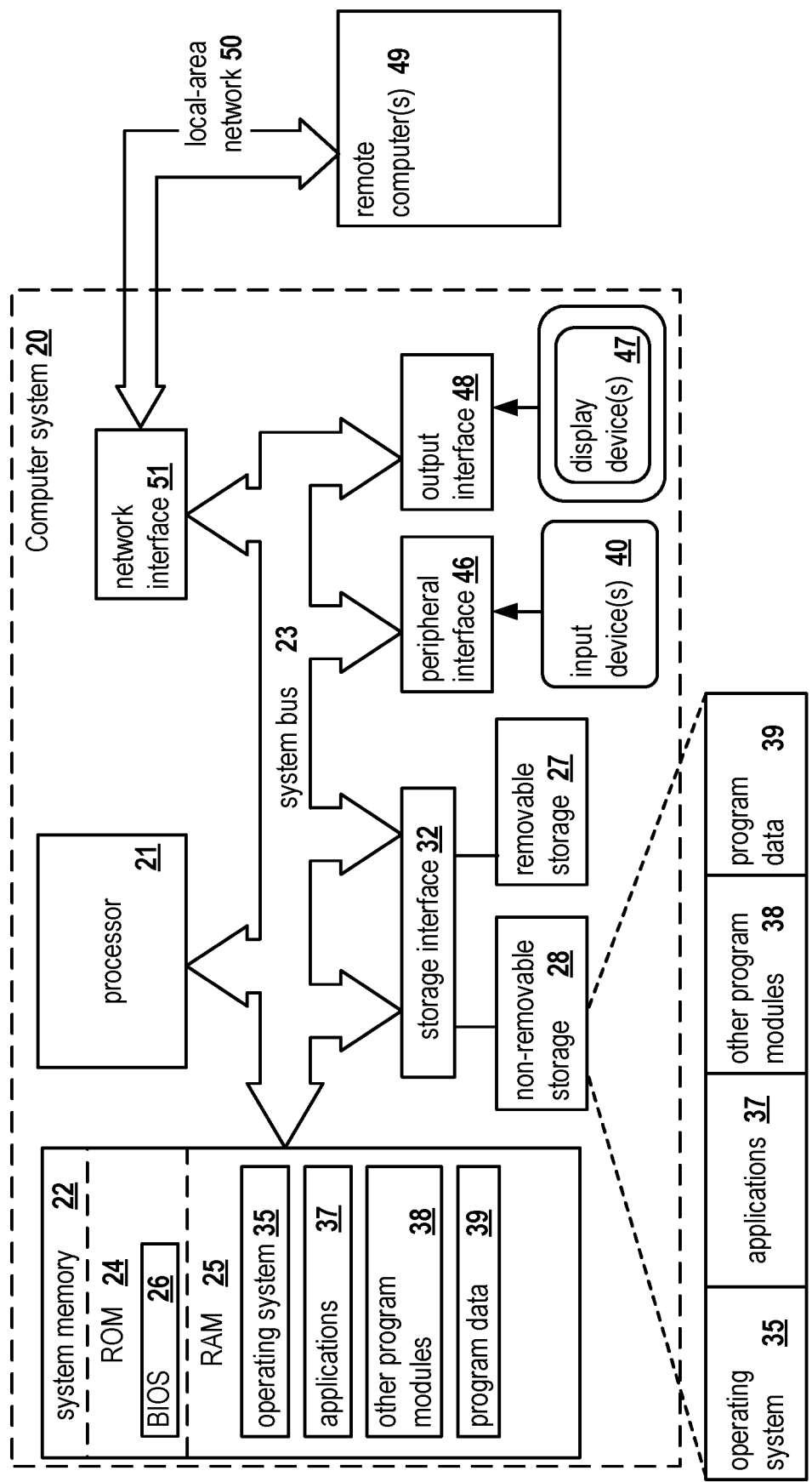
FIG. 5 is a block diagram of a computer system on which the disclosed system and method can be implemented according to an exemplary aspect.

FIG. 5 is a block diagram illustrating a computer system 20 on which aspects of systems and methods of determining a backup schedule based on data analysis and machine learning may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of determining a backup schedule on a computer system, comprising:
    collecting user behavior data on the computer system;
    analyzing the user behavior data to determine an optimal time of a backup session to create backup copies of modified data stored on a volume of the computer system;
    determining an optimal duration of the backup session based on the analyzed user behavior;
    prioritizing portions of the modified data based on priority rules;
    determining a prioritized portion of the modified data that can be saved during the backup session based on the duration, computer system hardware and network bandwidth at the optimal time of backup; and
    performing the backup session comprising the prioritized portion.

2. The method of claim 1, wherein the user behavior data comprises: when a user frequently modifies data, when the user saves the data to the computer system and usage of applications.

3. The method of claim 1, further comprising:
    analyzing the user behavior data using neural networks in order to determine the optimal time of the backup session.

4. The method of claim 1, wherein the priority rules assess, for a respective portion of the modified data, at least one of: (1) whether the respective portion is manually selected, (2) whether the respective portion is accessed more than a threshold amount of times, (3) whether the respective portion is labelled a critical file by the computer system, (4) whether the respective portion is accessed for longer than a threshold duration, (5) whether the respective portion was previously backed up within a threshold period of time.

5. The method of claim 4, wherein each priority rule is associated with a respective weight, and wherein prioritizing portions of the modified data further comprises:
    identifying a plurality of portions in the modified data;
    determining a subset of the plurality of portions that satisfy any of the priority rules; and
    ranking, based on the respective weight of a respective priority rule, the subset of the plurality of portions.

6. The method of claim 1, wherein the analyzing of the user behavior is performed for activity occurring within a predetermined period of time, further comprising:
    determining that a user is performing a particular activity based on an analysis of the user behavior;
    determining an optimal start, duration, and length of the backup session according to the particular activity.

7. The method of claim 6, wherein a respective portion with a higher rank is backed up prior to a respective portion with a lower rank.

8. A system of determining a backup schedule on a computer system, the system comprising:
    A hardware processor configured to:
        collect user behavior data on the computer system;
        analyze the user behavior data to determine an optimal time of a backup session to create backup copies of modified data stored on a volume of the computer system;
        determine an optimal duration of the backup session based on the analyzed user behavior;

prioritize portions of the modified data based on priority rules;
determine a prioritized portion of the modified data that can be saved during the backup session based on the duration, computer system hardware and network bandwidth at the optimal time of backup; and
perform the backup session comprising the prioritized portion.

9. The system of claim 8, wherein the user behavior data comprises: when a user frequently modifies data, when the user saves the data to the computer system and usage of applications.

10. The system of claim 8, wherein the hardware processor is further configured to analyze the user behavior data using neural networks in order to determine the optimal time of the backup session.

11. The system of claim 8, wherein the priority rules assess, for a respective portion of the modified data, at least one of: (1) whether the respective portion is manually selected, (2) whether the respective portion is accessed more than a threshold amount of times, (3) whether the respective portion is labelled a critical file by the computer system, (4) whether the respective portion is accessed for longer than a threshold duration, (5) whether the respective portion was previously backed up within a threshold period of time.

12. The system of claim 11, wherein each priority rule is associated with a respective weight, and wherein the hardware processor is configured to prioritize portions of the modified data by:
identifying a plurality of portions in the modified data;
determining a subset of the plurality of portions that satisfy any of the priority rules; and
ranking, based on the respective weight of a respective priority rule, the subset of the plurality of portions.

13. The system of claim 12, wherein a respective portion with a higher rank is backed up prior to a respective portion with a lower rank.

14. The system of claim 8, wherein the hardware processor is configured to analyze the user behavior over a predetermined period of time, and wherein the hardware processor is further configured to:
determine that a user is performing a particular activity based on an analysis of the user behavior;
determine an optimal start, duration, and length of the backup session according to the particular activity.

15. A non-transitory computer readable medium storing thereon computer executable instructions for determining a backup schedule on a computer system, comprising instructions for:
collecting user behavior data on the computer system;
analyzing the user behavior data to determine an optimal time of a backup session to create backup copies of modified data stored on a volume of the computer system;
determining an optimal duration of the backup session based on the analyzed user behavior;
prioritizing portions of the modified data based on priority rules;
determining a prioritized portion of the modified data that can be saved during the backup session based on the duration, computer system hardware and network bandwidth at the optimal time of backup; and
performing the backup session comprising the prioritized portion.

16. The non-transitory computer readable medium of claim 15, wherein the user behavior data comprises: when a user frequently modifies data, when the user saves the data to the computer system and usage of applications.

17. The non-transitory computer readable medium of claim 15, further comprising instructions for:
analyzing the user behavior data using neural networks in order to determine the optimal time of the backup session.

18. The non-transitory computer readable medium of claim 15, wherein the priority rules assess, for a respective portion of the modified data, at least one of: (1) whether the respective portion is manually selected, (2) whether the respective portion is accessed more than a threshold amount of times, (3) whether the respective portion is labelled a critical file by the computer system, (4) whether the respective portion is accessed for longer than a threshold duration, (5) whether the respective portion was previously backed up within a threshold period of time.

19. The non-transitory computer readable medium of claim 18, wherein each priority rule is associated with a respective weight, and wherein the instructions for prioritizing portions of the modified data further comprises instructions for:
identifying a plurality of portions in the modified data;
determining a subset of the plurality of portions that satisfy any of the priority rules; and
ranking, based on the respective weight of a respective priority rule, the subset of the plurality of portions.

20. The non-transitory computer readable medium of claim 19, wherein a respective portion with a higher rank is backed up prior to a respective portion with a lower rank.

* * * * *